United States Patent
Faibish et al.

(10) Patent No.: US 10,547,610 B1
(45) Date of Patent: Jan. 28, 2020

(54) AGE ADAPTED BIOMETRIC AUTHENTICATION

(71) Applicant: EMC IP Holding Company LLC, Hopkinton, MA (US)

(72) Inventors: Sorin Faibish, Newton, MA (US); John M. Bent, Los Alamos, NM (US); James M. Pedone, Jr., West Boylston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/674,420

(22) Filed: Mar. 31, 2015

(51) Int. Cl.
*H04L 29/06* (2006.01)
*H04L 9/32* (2006.01)
*G06F 21/32* (2013.01)

(52) U.S. Cl.
CPC .......... *H04L 63/0861* (2013.01); *G06F 21/32* (2013.01); *H04L 9/3231* (2013.01)

(58) Field of Classification Search
CPC .... H04L 63/0861; H04L 9/3231; G06F 21/32
See application file for complete search history.

(56) References Cited

U.S. PATENT DOCUMENTS

| 8,073,287 | B1* | 12/2011 | Wechsler | G06K 9/746 359/306 |
| 8,085,995 | B2* | 12/2011 | Yagnik | G06K 9/00288 382/118 |
| 8,457,367 | B1* | 6/2013 | Sipe | G06K 9/00221 382/118 |
| 8,493,178 | B2* | 7/2013 | Chung | G06K 9/00221 340/5.8 |
| 8,925,058 | B1* | 12/2014 | Dotan | G06F 21/31 713/186 |
| 9,119,539 | B1* | 9/2015 | Dotan | A61B 5/02438 |
| 9,147,061 | B1* | 9/2015 | McClendon | G06F 21/32 |
| 9,509,688 | B1* | 11/2016 | Magi Shaashua | H04L 63/0861 |
| 9,613,200 | B2* | 4/2017 | Boczek | G06F 21/32 |
| 2004/0129787 | A1* | 7/2004 | Saito | G06K 19/07 235/492 |
| 2005/0044056 | A1* | 2/2005 | Ray | G06F 16/532 706/52 |
| 2006/0047970 | A1* | 3/2006 | Mochizuki | G06K 9/00 713/186 |
| 2006/0110014 | A1* | 5/2006 | Philomin | G06K 9/00288 382/118 |

(Continued)

OTHER PUBLICATIONS

Microsoft Computer Dictionary, entry for "mobile computing", Microsoft Press, 2002, p. 343.*

(Continued)

*Primary Examiner* — Victor Lesniewski
(74) *Attorney, Agent, or Firm* — Ryan, Mason & Lewis, LLP

(57) ABSTRACT

A System, Computer program product, and computer-executable method of authenticating a user to a remote computing network, the System, Computer program product, and computer-executable including receiving a first portion of authentication data at a server, wherein the first portion of authentication data includes at least one feature of an image and analyzing the received first portion of authentication data by comparing the first portion of authentication data to a second portion of authentication data stored at the server.

20 Claims, 12 Drawing Sheets

(56) References Cited

U.S. PATENT DOCUMENTS

| | | | | |
|---|---|---|---|---|
| 2006/0133652 | A1* | 6/2006 | Iwasaki | G06F 21/32 |
| | | | | 382/115 |
| 2007/0061590 | A1* | 3/2007 | Boye | G06F 21/305 |
| | | | | 713/186 |
| 2007/0122005 | A1* | 5/2007 | Kage | G06K 9/00275 |
| | | | | 382/115 |
| 2009/0060294 | A1* | 3/2009 | Matsubara | G06F 16/532 |
| | | | | 382/118 |
| 2011/0002511 | A1* | 1/2011 | Imaoka | G06F 21/32 |
| | | | | 382/118 |
| 2011/0032378 | A1* | 2/2011 | Kaneda | G06K 9/00288 |
| | | | | 348/222.1 |
| 2011/0135165 | A1* | 6/2011 | Wechsler | G06K 9/6228 |
| | | | | 382/118 |
| 2012/0321144 | A1* | 12/2012 | Choong | G06K 9/00221 |
| | | | | 382/118 |
| 2013/0036459 | A1* | 2/2013 | Liberman | H04L 9/0866 |
| | | | | 726/6 |
| 2013/0063581 | A1* | 3/2013 | Komatsu | G06K 9/00926 |
| | | | | 348/77 |
| 2013/0212655 | A1* | 8/2013 | Hoyos | G06K 9/00107 |
| | | | | 726/5 |
| 2013/0227664 | A1* | 8/2013 | McKay | H04L 9/3231 |
| | | | | 726/7 |
| 2013/0247175 | A1* | 9/2013 | Nechyba | G06F 21/32 |
| | | | | 726/19 |
| 2013/0329967 | A1* | 12/2013 | Abiko | G06K 9/00026 |
| | | | | 382/115 |
| 2014/0165187 | A1* | 6/2014 | Daesung | G06F 21/32 |
| | | | | 726/19 |
| 2014/0201537 | A1* | 7/2014 | Sampas | H04W 12/06 |
| | | | | 713/186 |
| 2014/0241594 | A1* | 8/2014 | Ikeda | G06F 3/005 |
| | | | | 382/118 |
| 2015/0092996 | A1* | 4/2015 | Tian | G06K 9/00926 |
| | | | | 382/118 |
| 2015/0095996 | A1* | 4/2015 | Tang | H04L 63/0861 |
| | | | | 726/6 |
| 2015/0125046 | A1* | 5/2015 | Ikenoue | G06F 21/32 |
| | | | | 382/115 |
| 2015/0234881 | A1* | 8/2015 | Hirata | G06F 17/30348 |
| | | | | 707/609 |
| 2015/0358317 | A1* | 12/2015 | Deutschmann | H04L 63/0861 |
| | | | | 713/186 |
| 2016/0026781 | A1* | 1/2016 | Boczek | G06K 9/00885 |
| | | | | 726/18 |
| 2016/0063230 | A1* | 3/2016 | Alten | G06F 21/32 |
| | | | | 726/28 |
| 2016/0063235 | A1* | 3/2016 | Tussy | G06F 21/34 |
| | | | | 726/6 |
| 2016/0063314 | A1* | 3/2016 | Samet | G06K 9/00288 |
| | | | | 348/78 |
| 2016/0135046 | A1* | 5/2016 | John Archibald | H04W 12/06 |
| | | | | 455/411 |
| 2016/0292524 | A1* | 10/2016 | Weiss | G07C 9/00158 |

OTHER PUBLICATIONS

Microsoft Computer Dictionary, entry for "server", Microsoft Press, 2002, p. 474.*

Park, Unsang; Jain, Anil K.; "Face Matching and Retrieval Using Soft Biometrics", IEEE Transactions on Information Forensics and Secuirty, vol. 5, No. 3, Sep. 2010, pp. 406-415.*

Khan, Muhammad Khurram; Kumari, Saru; Gupta, Mridul Kumar; "Further Cryptanalysis of 'A Remote Authentication Scheme Using Mobile Device'", Fourth International Conference on Computational Aspects of Social Networks (CASoN), IEEE, Nov. 21-23, 2012, pp. 234-237.*

* cited by examiner

US 10,547,610 B1

AGE ADAPTED BIOMETRIC AUTHENTICATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer networks, such as those provided at a workplace, university, or other organization, are often configured to allow users to gain network access remotely through virtual private networks (VPNs), customized network settings, and/or other technologies. To gain access, users are generally required to authenticate to the remote network. Authentication may involve users providing various authentication factors, such as passwords, token codes, and personal identification numbers (PINs). Remote networks generally include, or have access to, an authentication server. The authentication server receives authentication requests from users and either grants or denies access, based on whether authentication factors provided with the requests match expected values. For added security, networks often require that multiple authentication factors be entered and verified before access can be granted.

A common two-factor authentication scheme involves both a token code and a PIN. The token code, also known as a one-time password, or "OTP," is generated automatically, such as by a portable device that a user has in his or her possession. The PIN is a number, or possibly an alphanumeric string, that the user has memorized. Both the token and the PIN have been registered previously in connection with the user at the authentication server. The user enters both the token code and the PIN in one or more fields of a network login screen on the user's computer. Access to the remote network is only granted to the user's computer if both the token code (something the user has) and the PIN (something the user knows) can be verified. An example of a portable token is SecureID®, which is available from RSA Security Inc. of Bedford, Mass.

Recently, software has been introduced to perform the functions of tokens on smart mobile devices, such as smart phones, PDAs, and tablets. In one example, a user of a computer wishing to access a remote network enters his or her PIN into a field displayed on the user's mobile device. The mobile device sends the PIN to an authentication server. If the PIN matches an expected value, the authentication server sends back a signal to unlock the mobile device to allow the mobile device to display a token code. The user can then transfer the token code manually to the computer to enable the computer to gain access to the remote network.

SUMMARY

A System, Computer program product, and computer-executable method of authenticating a user to a remote computing network, the System, Computer program product, and computer-executable including receiving a first portion of authentication data at a server, wherein the first portion of authentication data includes at least one feature of an image and analyzing the received first portion of authentication data by comparing the first portion of authentication data to a second portion of authentication data stored at the server.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 12 is an example of a method embodied on a computer readable storage medium that may utilize the

DETAILED DESCRIPTION

Typically, mobile devices have become more commonly used for personal and commercial uses. Conventionally, as mobile devices have become more popular, mobile device manufacturers have started integrating more comprehensive authentication techniques into the mobile devices to protect user information. Generally, the mobile device industry would benefit from improved authentication techniques to increase security of mobile devices.

In many embodiments, the current disclosure may enable integration of biometric authentication with mobile devices. In various embodiments, the current disclosure may enable a mobile device to authenticate a user based on facial recognition. In certain embodiments, the current disclosure may enable to increase success of facial recognition on users. In most embodiments, the current disclosure may enable a mobile device to recognize a user using facial recognition using an older user profile.

Biometric Authentication with Smart Mobile Device

An improved authentication technique employs a user's mobile device to obtain live, picture information of the user and applies the picture information as part of an authentication operation of the user to a remote network.

Particular embodiments will now be disclosed. It is understood that these embodiments are included by way of example only and are not intended as limiting the manner in which the invention hereof may be practiced.

Figure 1:
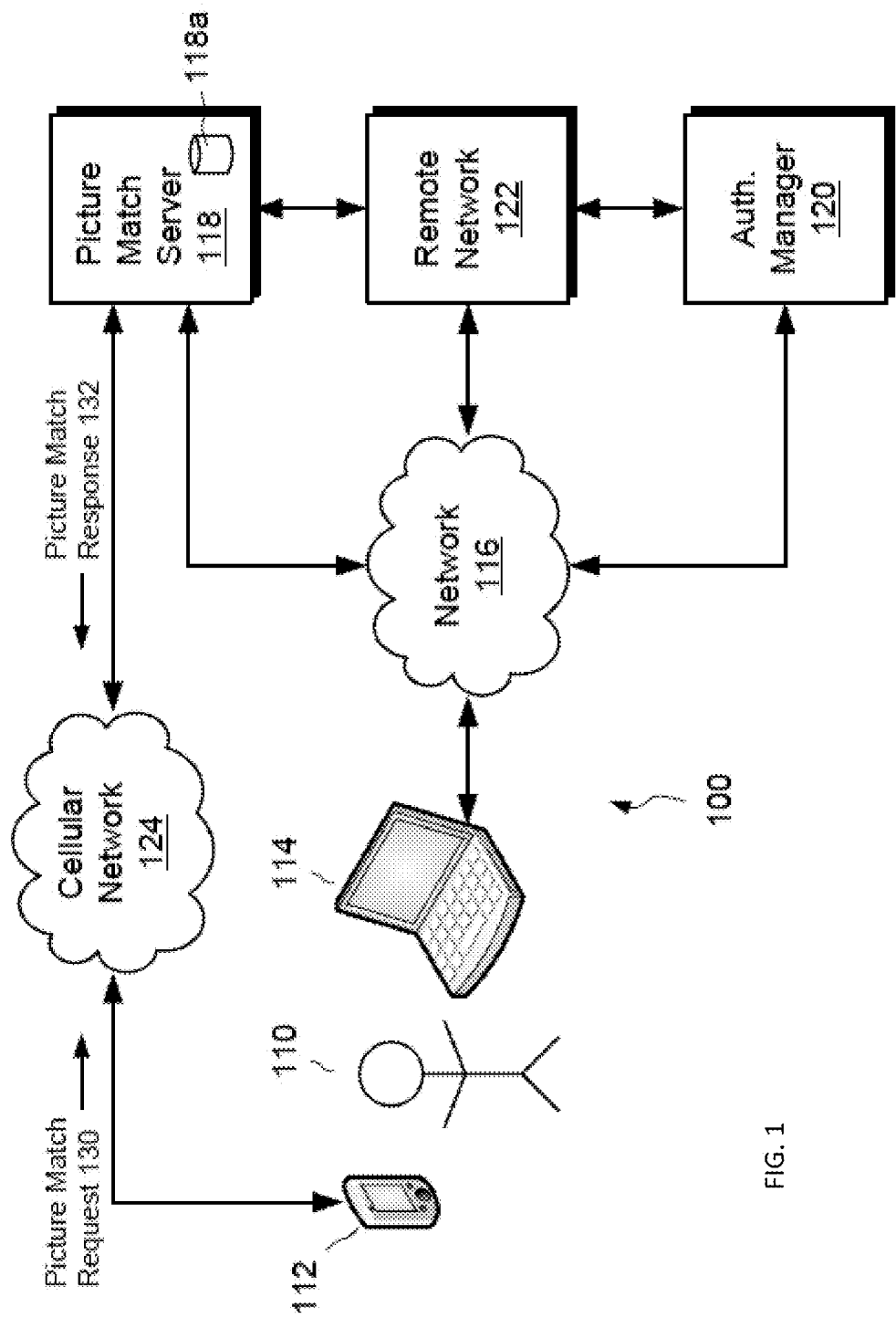
FIG. 1 is a block diagram of an example system for performing authentication with the aid of picture information obtained from a mobile device.

FIG. 1 shows an example environment 100 in which enhanced authentication techniques employing facial recognition may be conducted. The environment 100 includes a human user 110, a mobile device 112, and a computing device 114. The mobile device 112 is coupled to a cellular telephone network 124, and the computing device 114 is coupled to a network 116, such as the Internet. Also coupled to the network 116 are a picture match server 118, an authentication manager 120, and a remote network 122. The picture match server 118 is also preferably coupled to the cellular network 124.

The mobile device 112 is generally a smart phone, such as an iPhone, Blackberry, Android, or a similar device; however, the mobile device 112 can be any smart device equipped with a camera and a network connection, which is capable of communicating over the network and running software.

The computing device 114 is the device employed by the user 110 to accesses resources on the remote network 122. The computing device 114 is therefore generally a computer, such as a desktop or laptop computer. This is not critical, however, and the computing device 114 can be any type of computing device, including a tablet computer or even a smart phone or other mobile device itself.

The picture match server 118 and authentication manager 120 are preferably separate servers. They may be included within the remote network 122 or provided outside the remote network 122. Although the picture match server 118 and authentication manager 120 may be combined on a single computer, they are preferably maintained on physically separate computers, or even on separate networks, for enhanced security.

Figure 2:
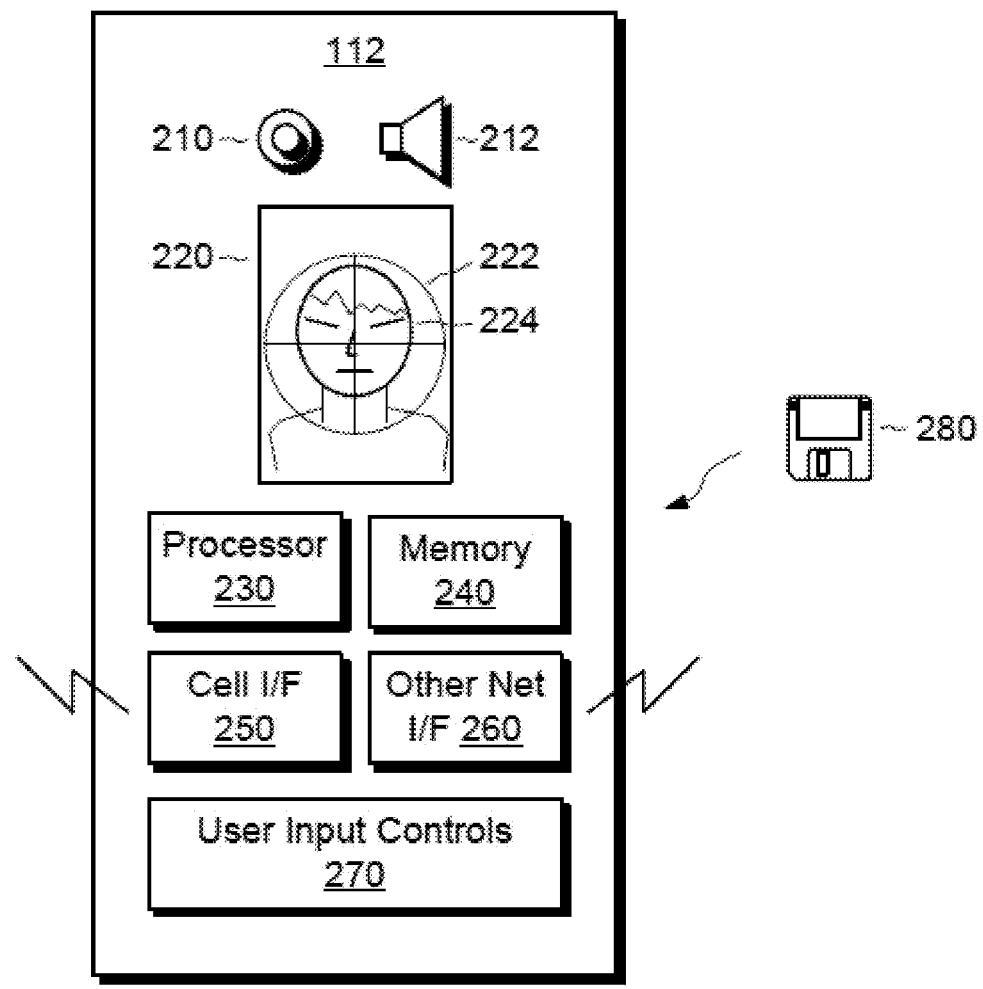
FIG. 2 is a block diagram of an example mobile device as shown in FIG. 1.

FIG. 2 shows an example mobile device 112. The mobile device 112 includes a camera 210, a speaker 212, and a display area 220. The mobile device 112 also generally includes a processor 230, memory 240, a cell interface 250, e.g., for communicating wirelessly over the cellular network 124, and another network interface 260, e.g., for communicating wirelessly over the network 114. User input controls 270, such as buttons and/or a touchpad are also included to allow the user 110 to enter data, such as numbers, letters, and other characters, into the mobile device 112. The mobile device 112 runs program code including a security application (e.g., an "app"). The app is used to acquire and process pictures of the user 110 and to provide a soft token code that the computing device 114 uses to access the remote network 122. The app is stored in the memory 240 and is executed on the processor 230.

When running the app on the mobile device 112, the user 110 sees an image 224 of himself or herself on the display 220, enabling the user to take a picture. Also, the app preferably displays an indicator 222. The indicator is superimposed on the image 224 of the user 110 and designates where the user should position his or her face on the display 220 for best photographic results. If the mobile device 112 is equipped only with a rear-facing camera, the mobile device 112 may alternatively generate an audible signal from the speaker 212, which directs the user to properly position his or her face relative to the field of view of the camera 210. The audible signal can take a number of forms, such as beeps issued as the user's face becomes properly aligned, and spoken instructions to direct the user to adjust the camera position, e.g., "left," "right," "up," and "down."

To initiate an authentication request to the remote network 122, the user 110 opens an application on the computing device 114 to start a VPN program. The application presents a login screen that displays fields into which the user 110 is directed to enter information, such as the user's user ID, a SecureID® token code, and a PIN, for example. The user 110 then accesses the mobile device 112 and starts the app. The app directs the user 110 to take a picture. The user 110 points the camera (or one of the cameras, where there are more than one) at his or her face and takes a picture. The app on the mobile device 112 processes the picture and extracts facial geometry from the image of the user's face.

The facial geometry may include a large number of reference points, or landmarks, from which the relative size, shape, and position of facial features may be computed. The greater the number of landmarks acquired, the greater the uniqueness of any individual's facial geometry. Previous work has shown that facial geometry is highly specific to each individual, and the chance of any two individuals, other than identical twins, having the same, or even closely matching, facial geometry is very low. Facial geometry is stored in the mobile device 112 in the form of a data set, which may be provided in a single file, such as a bitmap.

With the picture taken and the facial geometry extracted, the mobile device 112 sends a picture match request 130 to the picture match server 118. The picture match request 130 includes the facial geometry acquired for the picture just taken, as well as a direction for the picture match server 118 to compare the facial geometry with records of facial geometry stored on the picture match server 118.

The picture match server 118 includes a database 118a. The database 118a of the picture match server 118 can be constructed in any suitable way, but generally includes a different record for each user of the remote network 122. Each record stores, for example, the following fields:

a. an identifier of the user (e.g., an employee number or organization-issued ID number);

b. an identifier of the user's mobile device (e.g., an IMSI code)
c. the user's PIN; and
d. a set of facial geometry previously obtained from a picture of the user.

Most large companies and many organizations require users to obtain photo ID cards. In one example, facial geometry for populating the database 118*a* can be extracted conveniently from these photo ID cards, at no additional burden to users. In other examples, facial geometry for users may be obtained by other means, such as by separately photographing users or by having users photograph themselves with their own mobile devices and register their pictures with the picture server 118.

The picture match server 118 compares the facial geometry conveyed with the picture match request 130 with one or more records of facial geometry stored in the database 118*a* to determine whether there is a match, i.e., whether the facial geometry of the user substantially matches the facial geometry associated with the user, or with any of the users, whose facial geometry is stored in the database 118*a*. The picture match server 118 then issues a picture match response 132, which is sent back to the mobile device 112, preferably via the cellular network 124. The picture match response, which can include a PIN, a command, or other information, can then be used as part of an authentication operation by the user 110 to provide the computing device 114 with access to the remote network 122.

Preferably, the picture match request 130 is sent to the picture match server 118 via the cellular network 124. Although the mobile device 112 may support other networks, such as the network 116, the cellular network 124 is generally preferred for sending the picture match request 130, as the cellular network 124 is separate from the network 116 and thus provides an added measure of security (e.g., a malicious user on the network 116 monitoring the computing device 114 would not necessarily also be monitoring the same cell phone network 124 and coordinating traffic from the two sources).

FIGS. 3-6 show examples of various processes for authenticating the user 110 to the remote network 122 by applying facial geometry acquired with the mobile device 112. The various acts of each process may be ordered in any suitable way. Accordingly, embodiments may be constructed in which acts are performed in orders different from those illustrated, which may include performing some acts simultaneously, even though the acts are shown as sequential in the illustrated embodiments. Also, it is understood that these processes are presented merely as examples and are not intended as an exhaustive or limiting set of options.

Figure 3:
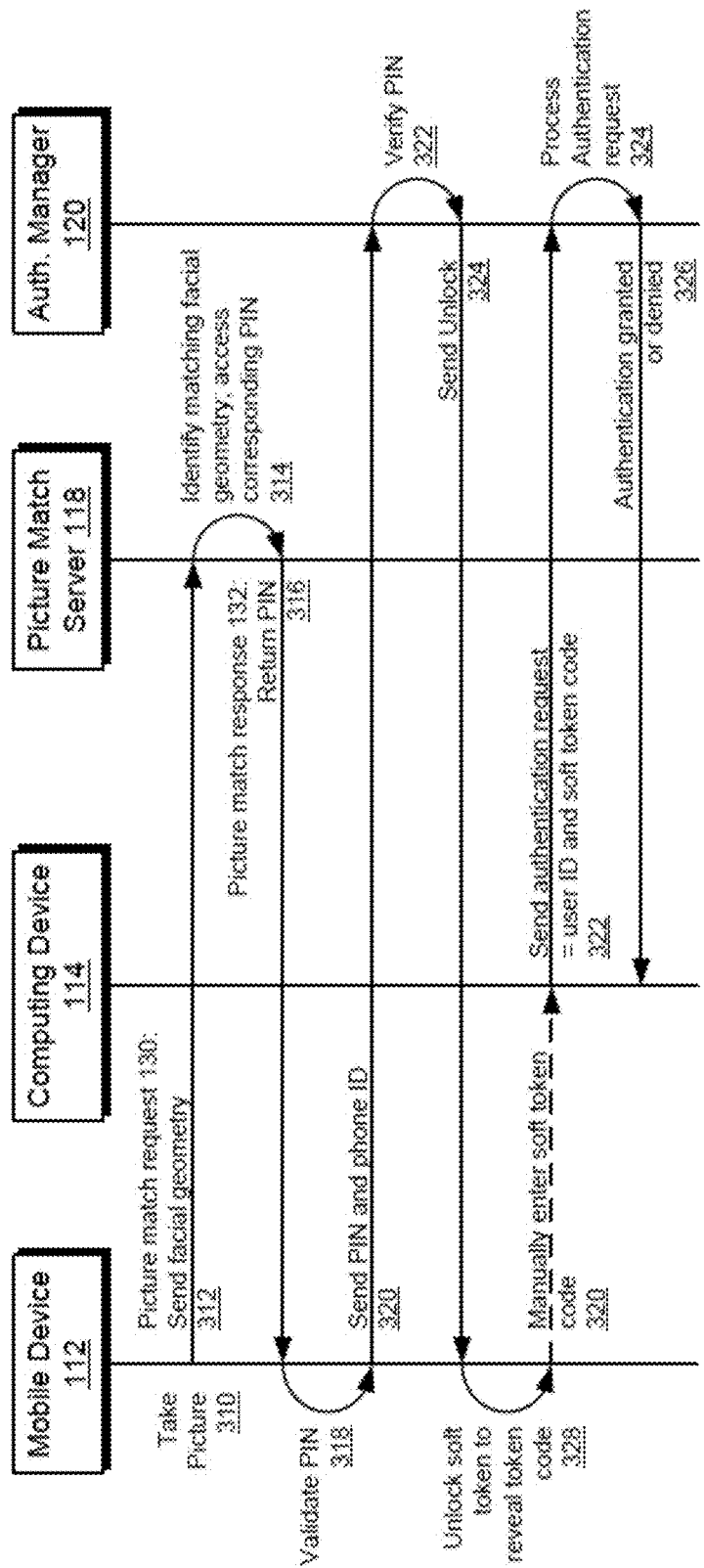
FIG. 3 is a sequence diagram showing an example sequence for authenticating a user to a remote computing network using picture information to unlock a soft token on the mobile device.

FIG. 3 shows an example process for using biometric information to unlock the app running on the mobile device 112, causing the app to display a soft token code to the user 110, which the user can apply to the computing device 114 to access the remote network. This process is similar to the prior process, which required the user to manually enter a PIN to unlock a mobile device. In this case, however, the user is not required to enter a PIN. Rather, the user takes a picture of him or herself and the PIN is entered automatically.

The process begins at event 310, with the user 110 starting the security app (described above) on the mobile device 112 and taking a picture of himself or herself. The mobile device 112 processes the picture and extracts the user's facial geometry from the picture. At event 312, a picture match request 130, which includes the facial geometry, is sent to the picture match server 118. The picture match server 118 compares the facial geometry from the picture match request 130 with one or more records of facial geometry stored in the database 318*a* (event 314). The picture match server 118 then sends a picture match response 132 back to the mobile device 112 (event 316). If a match is found, the picture match response 132 includes the PIN stored in the database 118*a* in connection with the user 110. The PIN may be, a long PIN, i.e., one that includes more than the usual number of characters. If no match is found, the picture match response 132 includes a message indicating that authentication is denied.

Once the user's PIN arrives at the mobile device 112, the app proceeds to validate the PIN. At event 320, the PIN is sent to the authentication manager 120, along with an ID of the phone, such as an IMSI code. At event 322, the authentication manager 120 verifies that the PIN and the phone ID belong to the same user and sends an UNLOCK command to the mobile device (event 324). Upon receiving the UNLOCK command, the app running on the mobile device 112 displays a previously hidden soft token code on the display 220 of the mobile device 112 (event 328).

At event 320, the user 110 manually enters the soft token code just displayed on the mobile device 112 and the user's user ID into the login screen on the computing device 114. At event 322, the computing device 114 submits an authentication request to the authentication manager 120. The authentication manager 120 receives the request and, at event 324, performs an authentication operation, applying the user ID and soft token code provided. At event 326, the authentication request is granted or denied.

It can be seen from the above that the process depicted in FIG. 3 is similar to the prior art technique described above, except that, rather than entering a PIN to unlock the soft token code, the user instead takes a picture of him or herself, whereupon the user's PIN is obtained automatically and used to unlock the soft token code on the user's behalf. The user is therefore not required to enter a PIN or even to remember a PIN. In some examples, the user is not required to register a PIN, either, and the PIN is instead generated by the authentication manager 120 and/or the picture match server 118 without involvement of the user.

Figure 4:
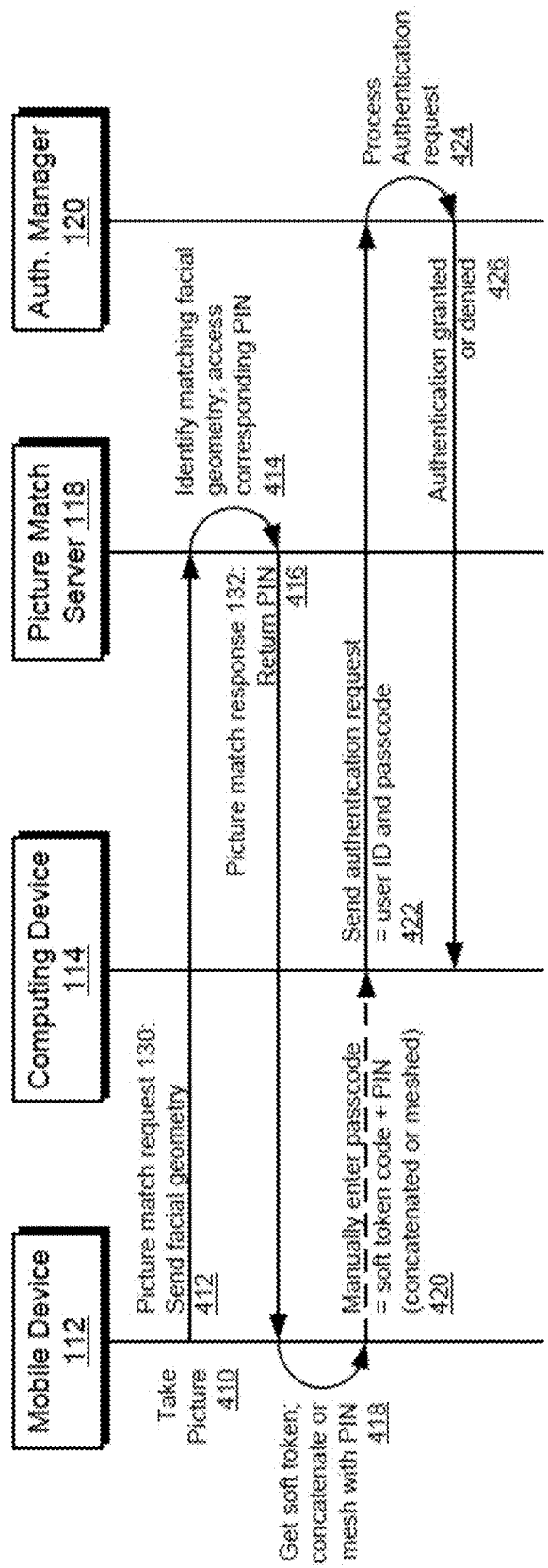
FIG. 4 is a sequence diagram showing an example sequence for authenticating a user to a remote computing network using picture information to obtain a PIN, wherein the PIN is combined with a token code to produce an authentication passcode.

The process shown in FIG. 4 can be simplified. For example, the picture match server 118, rather than sending a PIN back to the mobile device 112, can instead send an UNLOCK command directly. The mobile device 114 can then display a token code upon receiving the UNLOCK command, and events 318, 320, 322, and 324 can be omitted. According to this variant, verification of the PIN is performed by the picture match server 118, rather than by the authentication manager 120 as is usually the case.

FIG. 4 is a sequence diagram showing another use case. In the sequence of FIG. 4, the picture match server 118 sends a PIN back to the mobile device 112 to be combined with a soft token code to form a passcode.

At event 410, the user 110 takes a picture of himself or herself and the mobile device 112 extracts facial geometry. At event 412, a picture match request 130 is sent to the picture match server 118. The picture match request 130 includes the extracted facial geometry. At event 414, the picture match server 318 identifies a match (if there is one). The picture match server 318 accesses the database 318*a*, identifies the PIN associated with the matching facial geometry, and returns the PIN to the mobile device 112 in the picture match response 132. At event 418, the mobile device 112 combines the soft token code with the PIN and displays the combined result to the user 110 via the display 220. The soft token code and the PIN can be combined in various ways. In one example, the soft token code is simply concatenated with the PIN to form a passcode. For instance, a 6-digit soft token code is concatenated with a 4-digit PIN to produce a 10-digit passcode. In another example, the soft token code and the PIN are meshed together to form a passcode, i.e., a meshing algorithm is applied to blend the soft token code and the PIN together.

At event 420, the user 110 manually copies the passcode displayed on the mobile device 112 into the login screen of the VPN application running on the computing device 114. At event 422, the user 110 submits an authentication request from the computing device 114, including the user's user ID and the passcode. At event 424, the authentication manager 120 receives and processes the authentication request. The authentication manager 120 separates the passcode into its constituent soft token code and PIN. For meshed passcodes, the authentication manager 120 applies a de-meshing algorithm to reverse the effects of the meshing algorithm above. At event 426, authentication is either granted or denied.

Figure 5:
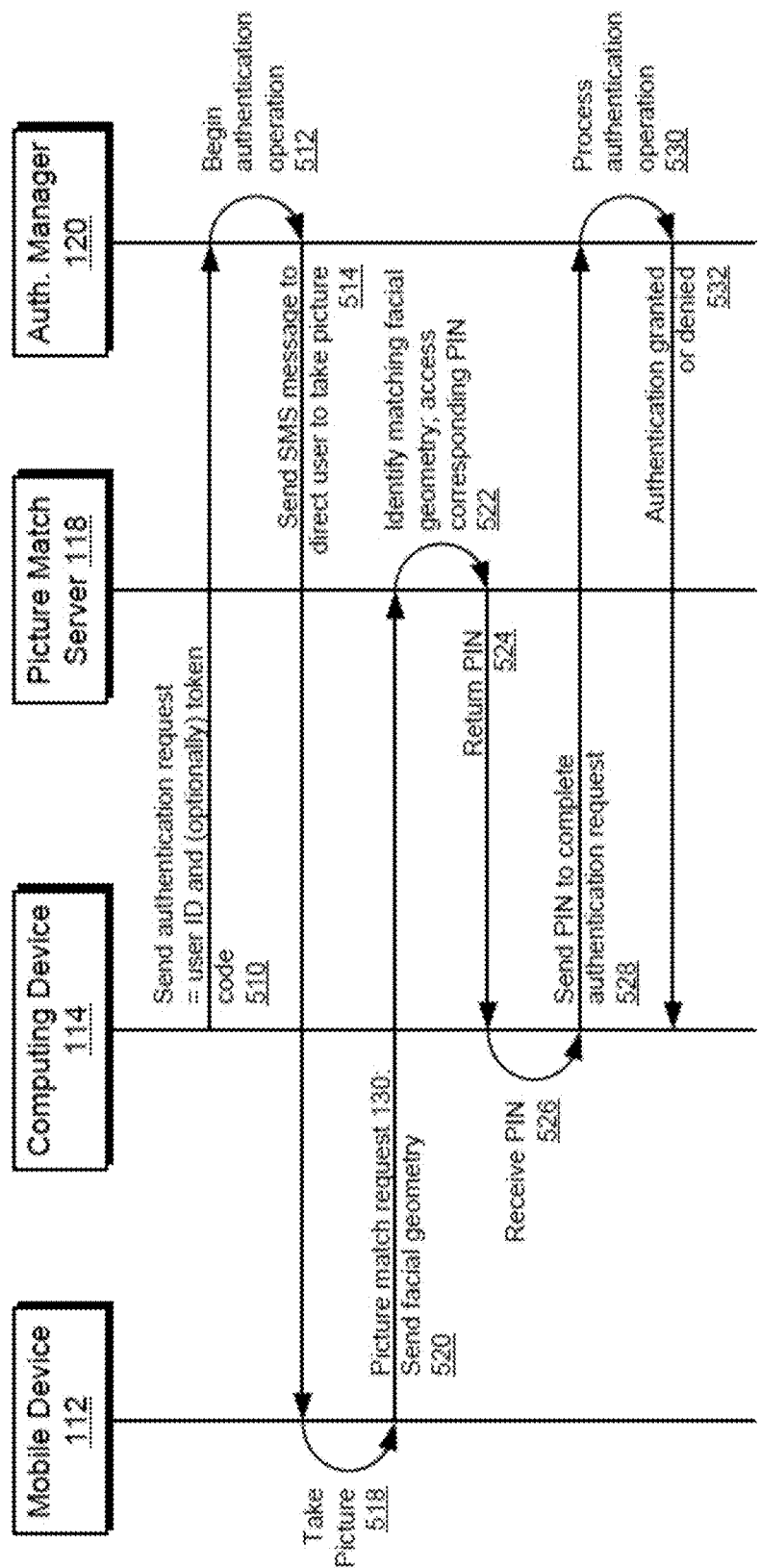
FIG. 5 is a sequence diagram showing an example sequence for authenticating a user to a remote computing network in a partially automated fashion using picture information.

In providing for the use of passcodes that include combinations of token codes and PINs, the use case of FIG. 5 fits readily with existing authentication techniques that employ passcodes (e.g., SecureID® authentication techniques). The existing techniques are improved, however, in that they require a facial recognition match before they release the user's PIN to the mobile device 112.

FIG. 5 is a sequence diagram showing a use case involving SMS messaging. The process for this example generally begins with the computing device 114. At event 510, the user 110 accesses a login screen from the VPN application on the computing device 114. The user typically enters the user's user ID and a token code. The token code is acquired either from a soft token running on the mobile device 112 (as in the previous examples) or from another type of token, such as a SecureID® key fob. The user 110 then submits the entered information to provide a partial authentication request.

At event 512, the authentication manager 120 receives the partial authentication request and begins an authentication operation. The authentication manager 120 identifies a mobile device phone number associated with the user ID received (e.g., from a database—not shown—of the authentication manager 120). The authentication manager 120 then sends an SMS message (i.e., a text message) to the mobile device 112. The text message instructs the user to launch the security app and take a picture of him or herself. At event 518, the user starts the security app on the mobile device 112 (assuming it is not running already) and takes the picture. The mobile device 112 extracts the facial geometry. At event 520, the mobile device 112 sends a picture match request 130, including the facial geometry, to the picture server 118. At event 522, the picture match server 118 searches the database 118a for a match. If a match is found, the picture match server identifies the PIN for the user in the database 118a, whose facial geometry matches the facial geometry provided with the picture match request 130.

At event 524, the picture match server 118 sends a response, not to the mobile device 112, but to the computing device 114. The response includes the user's PIN. At event 526, the computing device 114 receives the PIN and forwards the PIN to the authentication manager 120, thereby completing the authentication request begun at event 510. At event 530, the authentication manager 120 finishes performing the authentication operation by validating the PIN. If validation is successful, authentication is granted; otherwise, it is denied (event 532).

The use case of FIG. 5 has the advantage of never sending the PIN to the mobile device 112. The user 110, therefore, does not need to know the PIN or even know that there is a PIN. The PIN can be assigned by the picture match server 118 and/or the authentication manager 120, without user involvement. The user 110 therefore needs neither to remember a PIN, nor to enter a PIN, nor to register a PIN.

Figure 6:
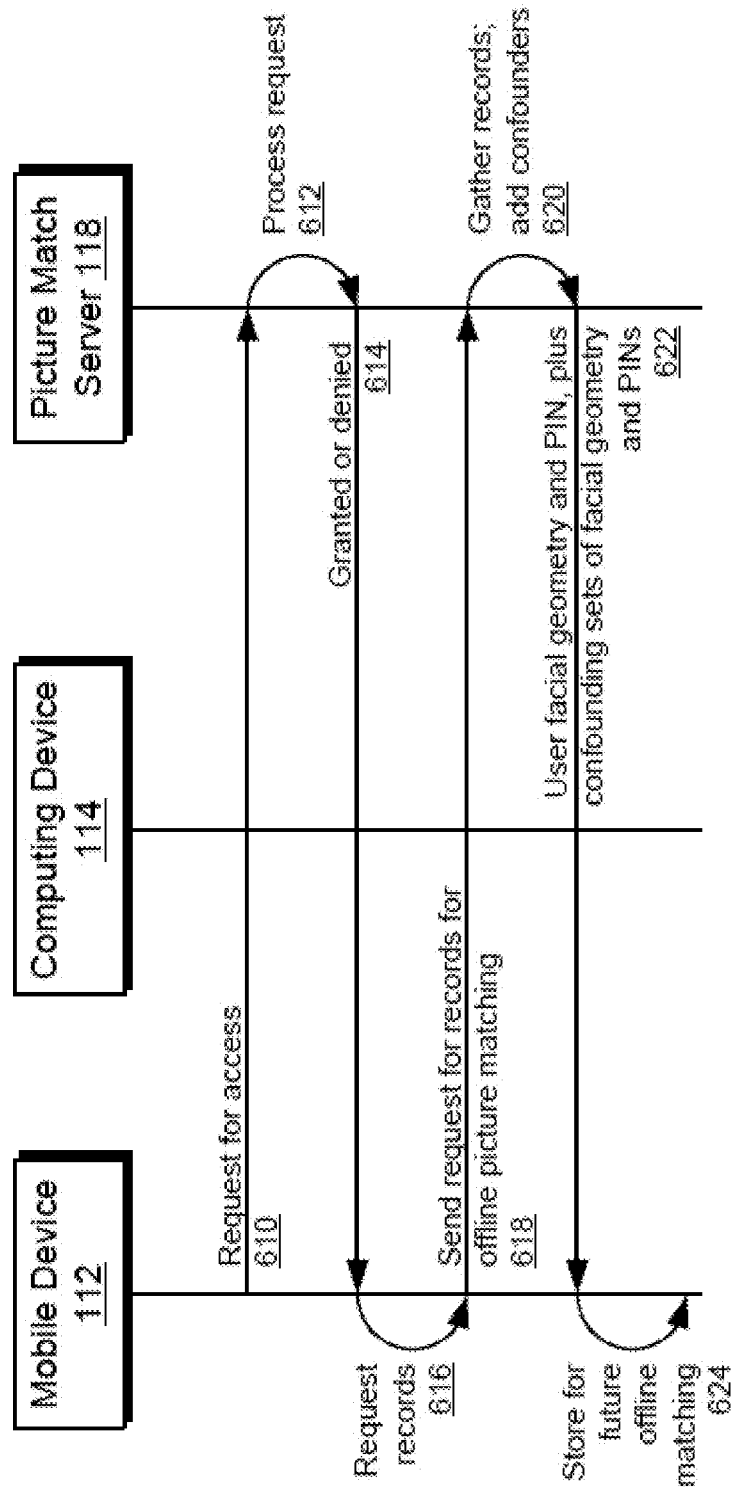
FIG. 6 is a sequence diagram showing an example sequence for providing the mobile device of FIGS. 1 and 2 with the user's PIN and previously stored picture information about the user, as well as confounding information, for enabling the user to use picture information to authenticate to the remote computing network even when the mobile device is disconnected from a network.

FIG. 6 is a sequence diagram showing still another use case. The use case of FIG. 6 pertains to preparing the mobile device 112 for off-line authentication. The process seeds the mobile device 112 with a set of records from the database 318a and creates, in effect, a local picture match server within the mobile device 112. The local picture match server enables the mobile device 112 to authenticate the user 110 of the computing device 114 to the remote network 122 even when the mobile device 112 is disconnected from the cellular network 124. A situation that calls for this type of authentication commonly arises on an airplane, for example, where the user 110 has WIFI access but no cellular telephone service.

The process of FIG. 6 may begin at event 610, when the mobile device 112, acting through the security app, sends a request for access to the picture match server 118. The request may include authentication information, such as the phone ID and facial geometry data of the user 110 (i.e., the user 110 may be prompted to take a picture). At event 612, the picture match server 118 processes the request. At event 614, the request is either granted or denied.

Assuming the request is granted, the app on the mobile device 112 requests multiple records at event 616. The request is sent to the picture match server 118 (event 618). The picture match server 118 gathers a set of records from the database 118a for transmission back to the mobile device 112 (event 620). The set of records includes the record for the user 110, as well as records for other users. The records for other users are preferably fictitious records, i.e., they do not correspond to any actual users but are instead included simply as confounding data intended to confuse malicious eavesdroppers. Also, certain fields of the database 118a, such as employee ID, are preferably omitted, since they serve no purpose in this process and should not be gratuitously transmitted over public networks.

At event 622, the collected set of records is sent back to the mobile device. Each record includes a set of facial geometry for the user designated in the record (of which only the facial geometry of the user 110 is preferably valid) and the respective user's PIN. At event 624, the mobile device 112 receives the set of records and stores the records for local matching at a later time. The mobile device 112 preferably creates an internal, local version of the picture match server 118, which it can use in place of the picture match server 118 for offline matching.

Subsequently, when the user's mobile device 112 is offline and the user 110 wishes to log onto to VPN, the app on the mobile device 112 can use the local version of the picture match server in place of the picture match server 118, and proceed to authenticate to the remote network 122 using any of the authentication processes described in connection with FIGS. 3-5 above.

Each of the use cases described above avoids the need for the user 110 to remember a PIN. In some of the use cases (e.g., those of FIGS. 3 and 5), the user 110 never comes in contact with the PIN or even necessarily knows that a PIN exists. The inconvenience and security hazards associated with PINs are therefore reduced or eliminated.

It is understood that the above-described matching of facial geometry does not require exact matching. Owing to different lighting conditions, different cameras, different moods of the user, and photographic variations, matching between the facial geometry from the mobile device 112 and facial geometry in the database 318a is almost never expected to be exact.

Preferably, the picture match server 118 uses fuzzy logic to compare facial geometry. The fuzzy logic can operate in many ways. In one example, the fuzzy logic identifies a degree of similarity between the user's facial geometry and one or more sets of facial geometry stored in the database 118a. A threshold is defined, above which the degree of similarity is deemed sufficient to establish a match. Below the threshold, the degree of similarity is deemed insufficient to establish a match. A wide array of fuzzy logic techniques may be employed. These include, for example, multivariate analysis of variance, modified TF-IDF (term frequency, inverse document frequency), SVD (single value decomposition), non-linear least squares QR decomposition, and vector comparisons. The foregoing list is not intended to be exhaustive. Many different techniques can be applied, as would be understood by those skilled in the art.

To improve precision, facial geometry from different pictures of the user 110 can be averaged. For example, the mobile device 112 can be programmed to automatically take a sequence of pictures of the user 110 in rapid succession. Facial geometry is extracted for each picture, and the different data sets of facial geometry are averaged together. The averaged facial geometry is then sent to the picture match server 118 for ascertaining a match.

In some examples, the picture match request 130 specifies a user ID or other identifier. In these cases, the picture match server 118 is required to perform only a single fuzzy logic comparison, i.e., to compare the facial geometry included with the picture match request 130 with the facial geometry corresponding to the user ID in the database 318a. In other examples, the picture match request 130 does not specify a user ID or other identifier. In those cases, the picture match server 118 compares facial geometry from the picture match request 130 with each set of facial geometry in the database 118a, until a match is found or all records have been examined.

The app running on the mobile device 112 is preferably equipped with safeguards to ensure that the picture of the user 110 is authentic. These safeguards operate to prevent a malicious user from gaining unauthorized access to the remote network 122 by using the mobile device 112 to take a picture of a photograph or video of the user 110. A variety of safeguards may be used.

In one example, the camera 210 on the mobile device 112 is directed to take a sequence of pictures of the user at high frequency and to search for small, rapid changes in the user's skin color. These changes correspond to the user's pulse, with small changes alternatively toward red and blue at the proper frequency indicating the ebb and flow of oxygenated blood. If the sequence of pictures reveals this variable coloration pattern, the subject of the picture is most likely a living being as opposed to a picture.

Another safeguard monitors infra-red light emitted by the subject of the picture. Although infra-red light is generally regarded as an undesirable side effect of electronic photography, infra-red light can be used to advantage in verifying picture authenticity, as human faces, and not pictures of human faces, give off infrared light in a known pattern.

Yet another safeguard applies geographic information about the user 110. It is common for mobile devices to track their geographic locations. Geographic location can be used as a safeguard to refuse authentication attempts if the mobile device 112 reports that it is outside its home country or state, or even if it is in some unexpected location.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described one embodiment, numerous alternative embodiments or variations can be made. For example, although the examples described above employ facial geometry, other forms of biometric information can be used. These include voice information and fingerprint information, for example. Rather than the mobile device 112 taking a picture of the user 110, the mobile device 112 can instead obtain a fingerprint or voice sample of the user 110, which it converts to a data set for comparison with data sets stored in connection with different users in the database 318a.

Also, although the mobile device 112 is described as a general-purpose device, such as a smart phone, PDA, tablet, and the like, it can also be a special purpose device, such as a key fob modified to include a camera, a processor, and memory. According to yet another variant, the mobile device 112 is itself a computer, such as a laptop computer. In some embodiments, the mobile device 112 can be the same as the computing device 114.

Also, although the security program running on the mobile device 112 is specified as being an "app," this is merely an example. The program can be any software construct running on the mobile device 112.

Although the examples described herein involve the use of VPN to access the remote network 122, this is also merely an example. The techniques described can be used in connection with a wide range of other technologies, such as web technology, remote desktop programs, and others.

Further, although the above-described techniques use the mobile device 112 to extract facial geometry from a picture of the user, this is just an example. Alternatively, a file or data stream representing the picture itself can be sent to the picture match server 118, and the picture match server 118 can extract the user's facial geometry remotely.

Also, although the PIN is described as an independent field of the database 118a, alternatively, the PIN may be computed from the facial geometry. For example, it can be a hash code of the facial geometry.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 280 in FIG. 2). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Age Adapted Biometric Authentication

In many embodiments, the current disclosure may enable creation of an age adapted biometric authentication system (AABAS). In certain embodiments, an AABAS may enable a device to recognize a user when compared to an older image of the user. In most embodiments, a device may include a mobile device, a desktop device, and/or other device enabled to provide a biometric authentication image to an AABAS. In other embodiments, an AABAS may enable a device to recognize a user when compared to a recent image of the user. In various embodiments, an AABAS may be enabled to determine whether a user's image and/or profile may need to be updated to maintain efficient authentication using an AABAS.

In certain embodiments, a device may be enabled to provide a feature vector of a current biometric authentication image to an AABAS. In these embodiments, an AABAS may be enabled to compare a received feature vector with a stored feature vector. In most embodiments, a stored feature vector may be derived from a base biometric authentication image stored within the AABAS. In some embodiments, when a received feature vector does not match a stored feature vector within a specified variance, an AABAS may request the recently created biometric authentication image be transmitted to the AABAS for authentication. In these embodiments, an AABAS may authenticate the current biometric authentication image with the stored biometric authentication image and, once verified, update a user's profile with the current biometric authentication image. In certain embodiments, when a current biometric authentication image is received, an AABAS may update the associated stored feature vector to include new features from the current biometric authentication image.

In many embodiments, a feature vector may be an n-dimensional vector of numerical features that may represent an object, such as a face. In various embodiments, a feature vector may be a facial feature vector. In some embodiments, a facial feature vector may include information related to one or more features of a face. In most embodiments, a facial feature vector may include a correlation of vertical pixel lines, correlation of horizontal pixel lines, eyeball size, distance between the center of each eye, nose and lip angles versus eye line or ear line, average hair color, and/or other geometrical and/or statistical information in relation to a person's facial features. For example, in some embodiments, facial features may include positions of facial lines and/or angles versus major facial lines. In some embodiments, eye line versus ear line may be an age invariant feature. In some embodiments, eye line versus ear line may not change significantly after the age of 10.

In most embodiments, a device may process a current image by creating a features vector of an image and sending the features vector to an AABAS for authentication. In some embodiments, an AABAS may compare a received feature vector to a stored feature vector. In various embodiments, an AABAS may prompt a device to take and/or store a new biometric authentication image each time a user authenticates using the AAFCS system. In some embodiments, an AABAS may collect and/or store differences between a current and stored image. In many embodiments, an AABAS may request that a user to update their image when differences between a received feature vector and a stored feature vector exceed a specified threshold. In other embodiments, an AABAS may enable a user to frequently update their user profile with stored differences and/or an updated biometric authentication image.

In many embodiments, an AABAS may enable a device to authenticate using age invariant features of a user. In various embodiments, invariant features may include, but not limited to, birth marks, age lines, shape of a user's eyes, cheek dimensions, chin dimensions, forehead dimensions, and/or other invariant features. In certain embodiments, an AABAS may enable a device to populate a feature vector with age invariant features of a user. In certain embodiments, an AABAS may enable a device to authenticate a biometric authentication image by analyzing invariant features of a user. In most embodiments, an AABAS may enable a device to authenticate using a combination of comparing a biometric authentication image with a previously stored biometric authentication image, analysis of differences of biometric authentication images, and/or analysis of invariant features of a user. In some embodiments, an AABAS may be enabled to track and/or store more age invariant features as a user ages, as a user may gain more age invariant features as they age.

In most embodiments, an AABAS may be enabled to filter and/or analyze a user biometric authentication image according to an age of the user and/or age of the user in the stored image. In various embodiments, an AABAS may be enabled to determine whether a user's biometric authentication image should be updated and/or replaced based on how age of a user's biometric authentication image and/or an amount of differences between a current biometric authentication image and a stored biometric authentication image. In certain embodiments, an AABAS may be enabled to authenticate using a user's biometric authentication image even when a user's stored authentication image includes differences from a current authentication image.

In most embodiments, an AABAS may be enabled to determine a threshold at which authentication of a biometric authentication image may be possible. In various embodiments, a threshold may be set on the characteristic features extracted from a biometric authentication image according to a set of N characteristics. For example, in various embodiments, p % of the N features may allow for identification with a correlation higher than q % in addition to the correlation between images. In some embodiments, multiple biometric authentication images may need to be compared to determine a threshold, p, of a specific user.

In many embodiments, a selection of p % and/or q % may be based on a comparison of each image from a database of authentication images. In various embodiments, the selection of p % and/or q % may minimize the number of false positive, p %, and/or false negatives, q %. In most embodiments, an AABAS may start with a p %>95% of the features. In other embodiments, an AABAS may decrease a p % with no false positives. In some embodiments, q % may be a threshold based on the data base and may be required to be over 51%. In many embodiments, p and q parameters may be tuned such that when the q decreases and the number of false negatives (rejected detection for valid id) increases, denying access to the right users, an AABAS may request a user to update their image such that p may be high enough to reduce the false negatives to a minimum threshold value.

In certain embodiments, tracing and/or recording changes between different biometric authentication images of an aging user may increase the efficiency of an AABAS, as age invariant features increase as a user ages. In some embodiments, as a user ages, an AABAS may store an initial biometric authentication image, a periodic update to the biometric authentication image, and/or store changes between each biometric authentic image used and/or stored. In many embodiments, stored changes may be utilized to determine whether a user should update their biometric authentication image and/or profile. In other embodiments, if stored changes exceed a threshold level, an AABAS may determine that a user is required to add higher quality biometric authentication image and/or updated biometric authentication image. In various embodiments, changes and/or deltas between biometric authentication images may be compressed using jpeg and/or mpeg methods used for B and P frames which may allow playing out a series as life stream using a basic jpeg/mpeg codec available on any device.

Figure 7:
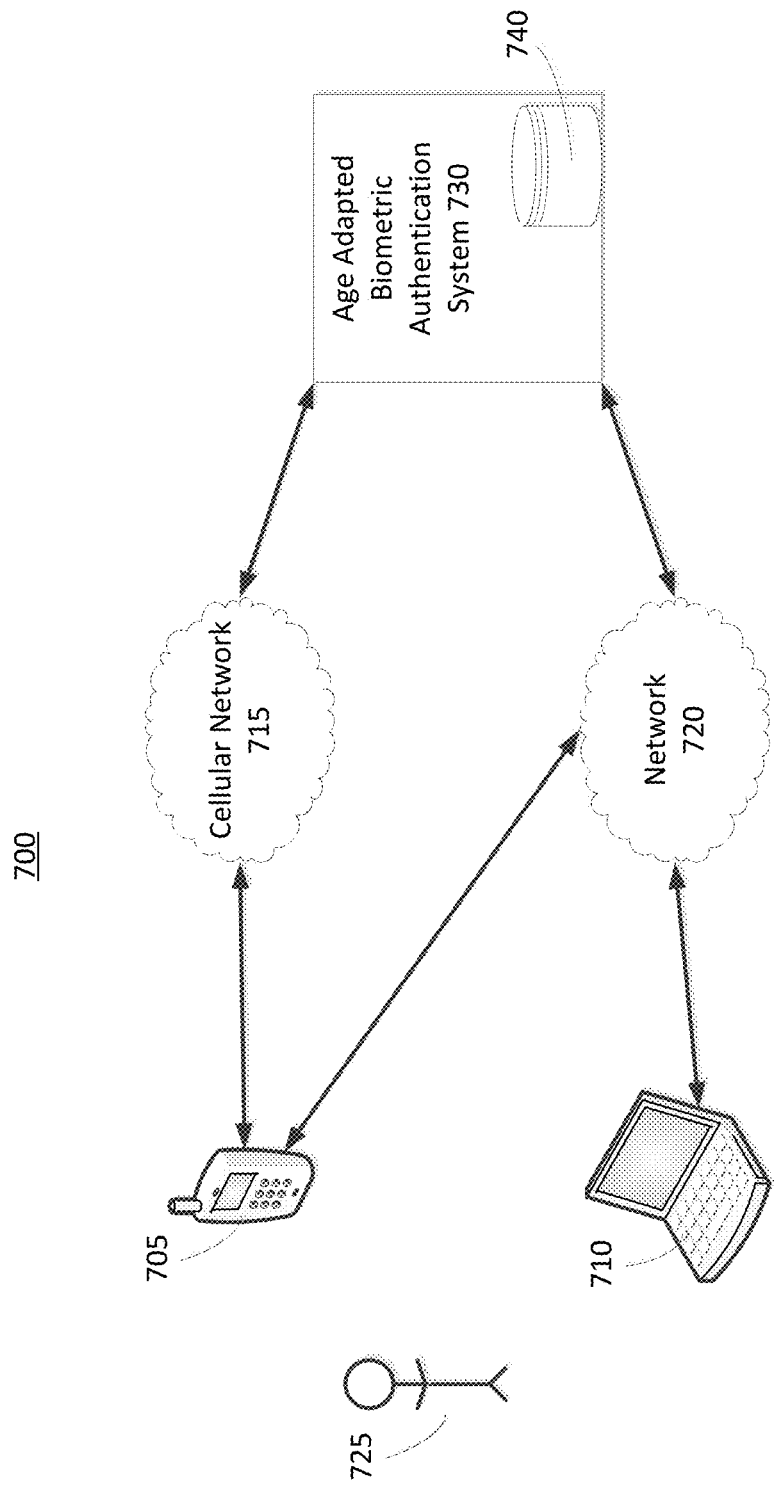
FIG. 7 is a simplified illustration of an Age Adapted Biometric Authentication System (AABAS), in accordance with an embodiment of the present disclosure.

Refer to the example embodiment of FIG. 7. FIG. 7 is a simplified illustration of an Age Adapted Biometric Authentication System (AABAS), in accordance with an embodiment of the present disclosure. As shown, System 700 includes AABAS 730, a connection to cellular network 715, and a connection to network 720. AABAS 730 includes data storage 740 for storing feature vectors and biometric authentication images. System 700 is enabled to accessed and/or utilized with Smart Phone/Device 705 and mobile device 710. In this embodiment, smart phone 705 is enabled to communicate with AABAS 730 through cellular network 715 or network 720. Mobile device 710 is enabled to communicate with AABAS 730 through network 720. In certain embodiments, a mobile device may include a cellular and/or a wireless adapter which may enable the mobile device to connect to an AABAS through multiple paths. In this embodiment, user 725 is enabled to use smart phone/device 705 or mobile device 710 to utilize AABAS to authenticate a biometric authentication image.

In this embodiment, AABAS 730 is enabled to receive biometric authentication images and/or feature vectors to enable authentication with stored biometric authentication images and/or stored feature vectors. AABAS 730 is enabled to authenticate each received biometric authentication image by analyzing differences between the received biometric authentication image and one or more stored biometric authentication images. AABAS 730 is enabled to create a feature vector of age invariant features detected within each received biometric authentication image. In many embodiments, an AABAS may store a feature vector of age invariant features. In various embodiments, an AABAS may continually update a user's feature vector based on subsequently received biometric authentication images.

Figure 8:
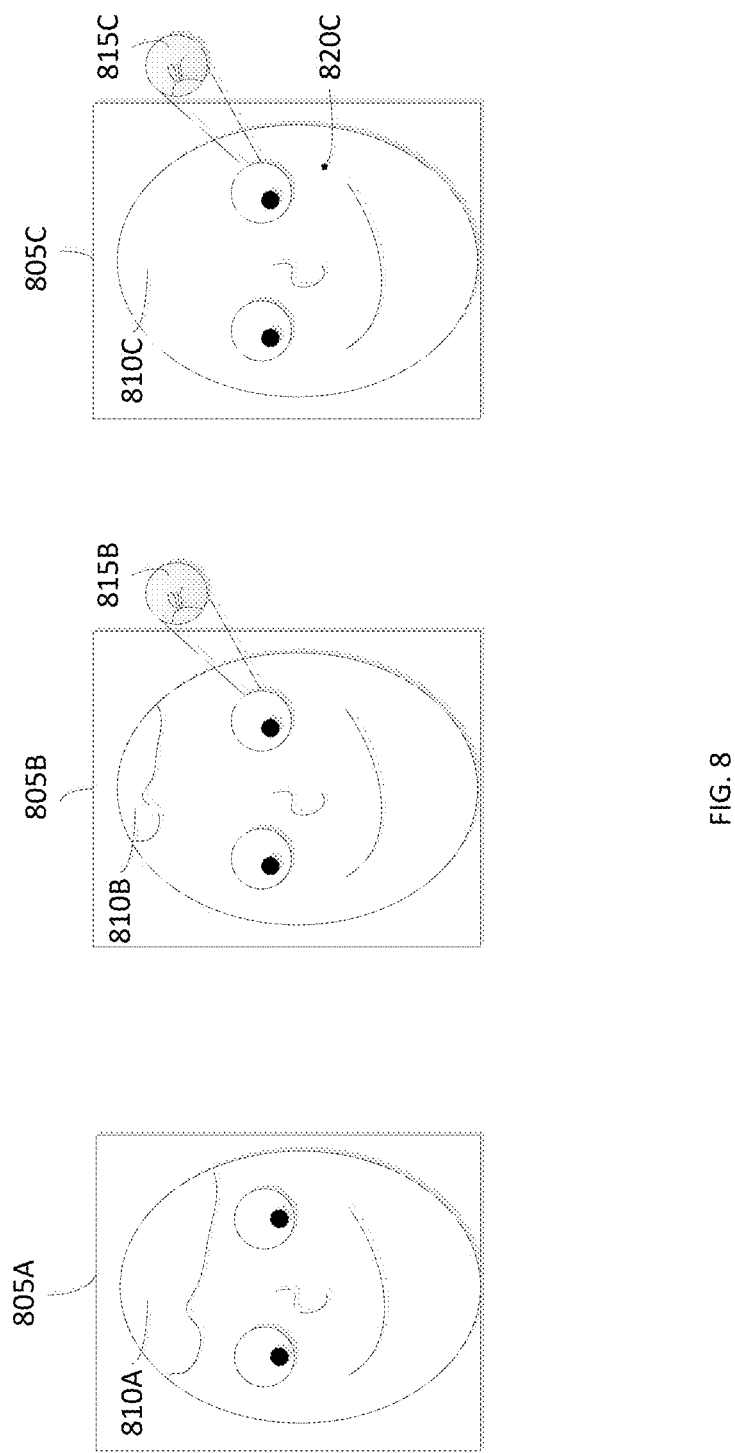
FIG. 8 is a simplified illustration of biometric authentication images received by the AABAS as described in FIG. 7, in accordance with an embodiment of the present disclosure.

Refer to the example embodiment of FIG. 8. FIG. 8 is a simplified illustration of biometric authentication images received by the AABAS as described in FIG. 7, in accordance with an embodiment of the present disclosure. As shown, image 805A, image 805B, and image 805C are biometric authentication images of user 725 (FIG. 7). Image 805A is an initial biometric image of user 725 (FIG. 7) which is used as a baseline for biometric authentication by AABAS 730 (FIG. 7). Image 805B is a biometric authentication image taken six (6) months after image 805A. Image 805C is a biometric authentication image taken six (6) months after image 805B. Upon receiving image 805B, AABAS 730 (FIG. 7) is enabled store differences between image 805A and image 805B. In this embodiment, differences include a feature vector of age invariant features, such as hairlines (810A-C, 810 Generally), age lines (815B-C, 815 Generally), and/or birth marks (820C, 820 Generally). User 725 (FIG. 7) hairline differs each biometric authentication image. Hairline 810A covers a larger portion of User 725 (FIG. 7) head. Hairline 810B covers a smaller portion of User 725 (FIG. 7) head. In image 805C, user 725 (FIG. 7) hairline 810C does not appear. Image 805B and Image 805C includes age lines 815B and 815C respectively. Image 805C contains birth mark 820C, while image 805A and image 805B do not contain any birth marks.

In many embodiments, over time, an AABAS is enabled to create a profile of a user that may become more and more accurate over time. In various embodiments, as a user gains more age invariant features, a user may be more recognizable to an AABAS. For example, as shown in FIG. 8, age lines 815B, 815C do not significantly change after they appear. Birth mark 820C likely will not change after it has appeared in image 805C. AABAS 730 (FIG. 7) is enabled to utilize age invariant features, as described in FIG. 8, to authenticate a biometric authentication image.

Figure 9:
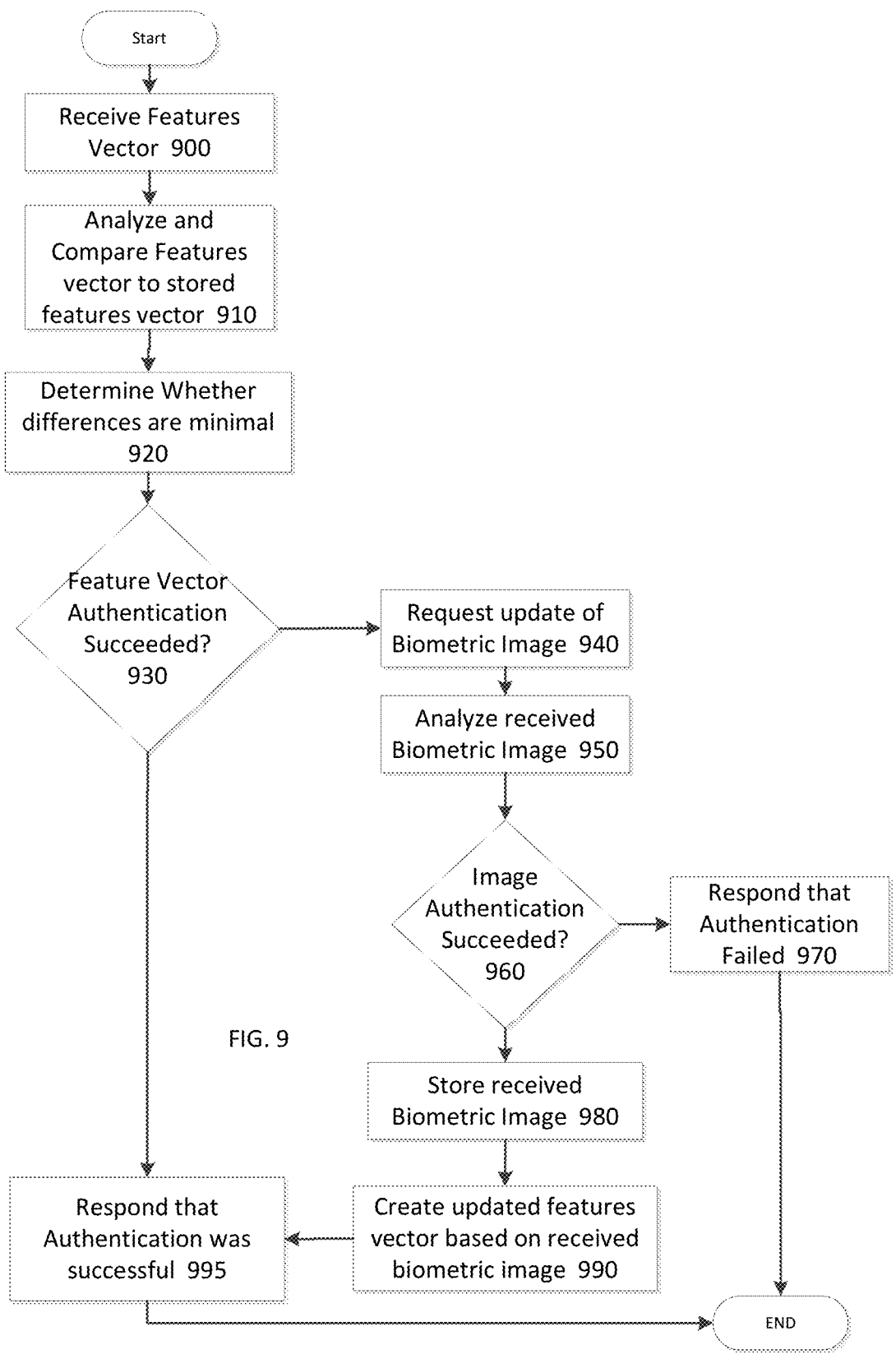
FIG. 9 is a simplified flowchart of a method of authenticating biometric authentication images (as shown in FIG. 8) using an Age Adapted Biometric Authentication System (AABAS) (as shown in FIG. 7), in accordance with an embodiment of the present disclosure.

Refer to the example embodiments of FIGS. 7-9. FIG. 9 is a simplified flowchart of a method of authenticating biometric authentication images (as shown in FIG. 8) using an Age Adapted Biometric Authentication System (AABAS) (as shown in FIG. 7), in accordance with an embodiment of the present disclosure. As shown, System 700 (FIG. 7) includes AABAS 730 (FIG. 7), a connection to cellular network 715 (FIG. 7), and a connection to network 720 (FIG. 7). AABAS 730 (FIG. 7) initially has image 805A (FIG. 8) stored within data storage 740 and an associated stored features vector created from analyzing image 805A (FIG. 8). User 725 (FIG. 7) utilizes Smart phone/device 705 (FIG. 7) to authenticate using AABAS 730 (FIG. 7). User 725 (FIG. 7) uses smart phone/device 705 (FIG. 7) to take a picture of User 725 (FIG. 7) which creates image 805B (FIG. 8).

Smart phone/device 705 (FIG. 7) creates a features vector of image 805B (FIG. 8) and forwards the features vector to AABAS 730 (FIG. 7). AABAS 730 (FIG. 7) receives the features vector (Step 900). AABAS 730 (FIG. 7) analyzes and compares the received features vector with a stored features vector associated with User 725 (FIG. 7) (Step 910). AABAS 730 (FIG. 7) determines whether differences between the received features vector and the stored features vector is below a specified threshold value (Step 920). In many embodiments, if differences between feature vectors may be below a specified threshold value, an AABAS may respond by signaling a successful biometric authentication. In other embodiments, if differences between feature vectors may be greater than a specified threshold value, an AABAS may respond by signaling failure of the biometric authentication and request that a smart phone/device forward the recently created image.

In this embodiment, the feature vector of image 805B (FIG. 8) differs by more than the specified threshold from the stored feature vector and Feature Vector Authentication was not successful (Step 930). AABAS 730 (FIG. 7) directs smart phone/device 705 (FIG. 7) to forward image 805B (FIG. 8) to AABAS 730 (FIG. 7) (Step 940) to be analyzed and authenticated with image 805A (Step 950). Upon determination that authentication of image 805B succeeded (Step 960), AABAS 730 (FIG. 7) updates the stored feature vector with age lines 815B (FIG. 8) and changed hairline 810B (FIG. 8) (Step 990) and stores image 805B (FIG. 8) (Step 980). AABAS 730 (FIG. 7) responds that authentication was successful (Step 995). If Feature vector authentication and image authentication did not succeed, AABAS 730 (FIG. 7) responds that authentication failed.

Figure 10:
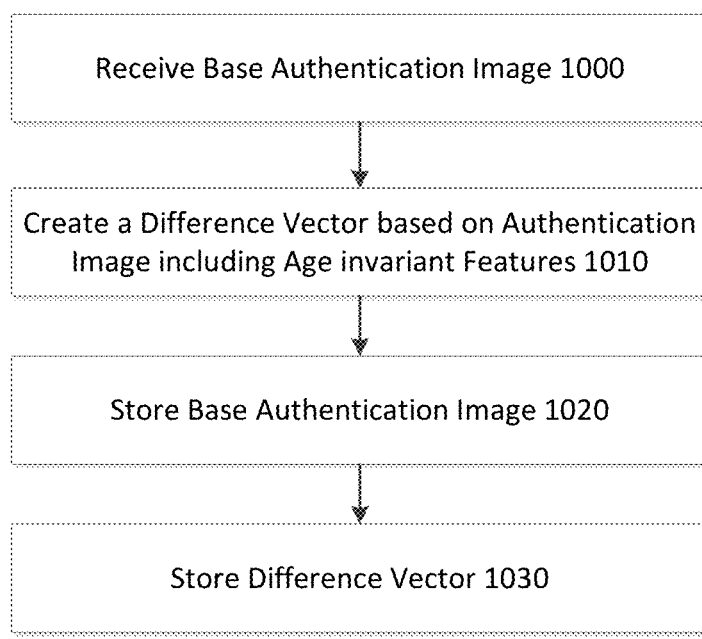
FIG. 10 is a simplified flowchart of initializing a biometric authentication profile using an Age Adapted Biometric Authentication System (as described in FIG. 7), in accordance with an embodiment of the present disclosure.

Refer to the example embodiments of FIGS. 7 and 10. FIG. 10 is a simplified flowchart of initializing a biometric authentication profile using an Age Adapted Biometric Authentication System (as described in FIG. 7), in accordance with an embodiment of the present disclosure. As shown, System 700 includes AABAS 730, a connection to cellular network 715, and a connection to network 720. User 725 utilizes mobile device 710 to communicate with AABAS 730. User 725 creates a biometric image using mobile device 710 and sends the biometric image to AABAS 730. AABAS 730 receives the base authentication image (Step 1000) and processes the base authentication image. In this embodiment, processing includes creating a difference vector based on the base authentication image, wherein the difference vector includes age invariant features if they exist within the base authentication image (Step 1010). AABAS 730 stores the base authentication image in database 740 (Step 1020) and stores the created difference vector in database 740 (Step 1030).

General

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 11:
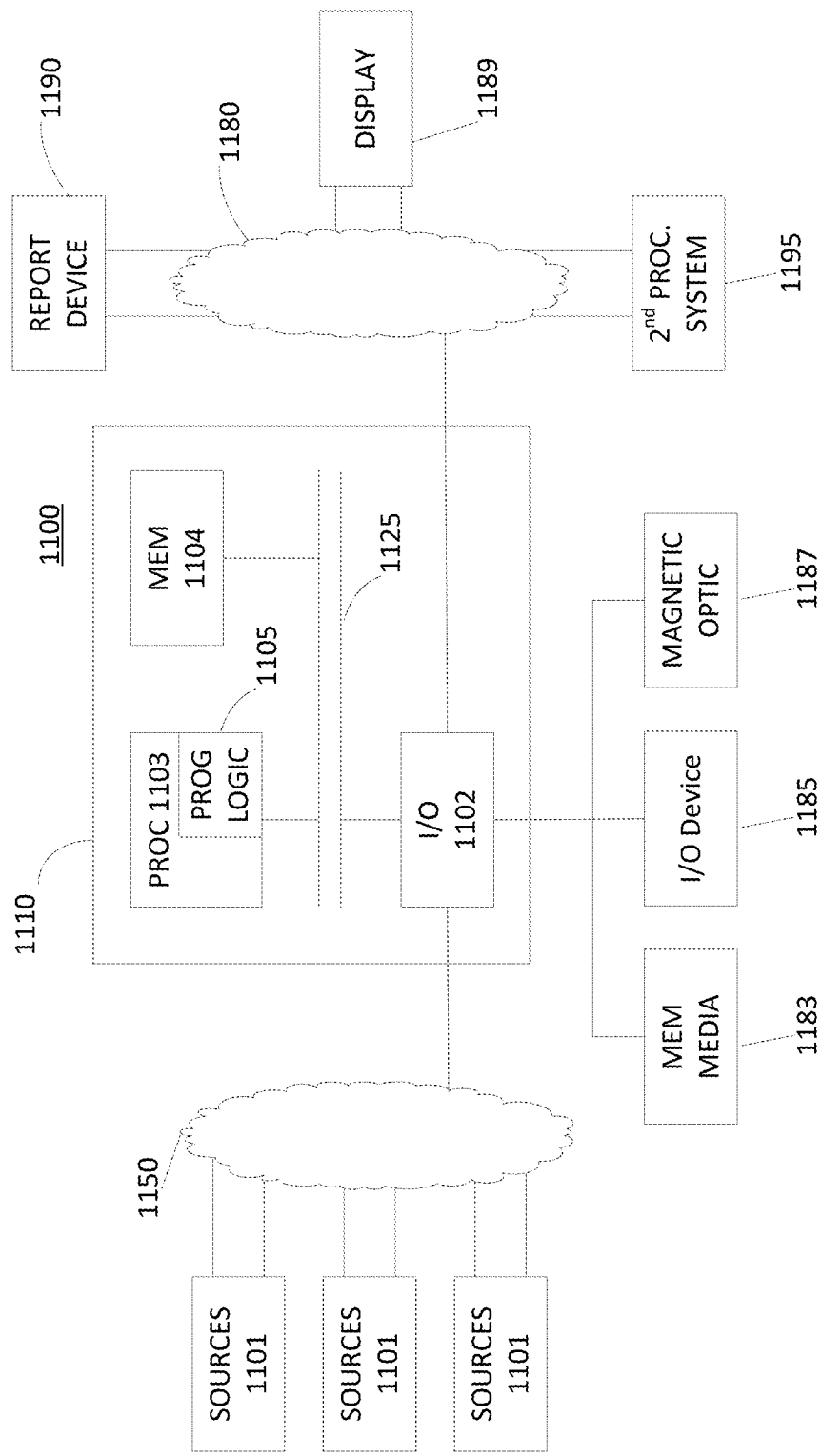
FIG. 11 is an example of an embodiment of an apparatus that may utilize the techniques described herein, in accordance with an embodiment of the present disclosure.

FIG. 11 is a block diagram illustrating an apparatus, such as a computer 1110 in a network 1100, which may utilize the techniques described herein according to an example embodiment of the present invention. The computer 1110 may include one or more I/O ports 1102, a processor 1103, and memory 1104, all of which may be connected by an interconnect 1125, such as a bus. Processor 1103 may include program logic 1105. The one or more I/O ports 1102 may provide connectivity to memory media 1183, I/O devices 1185, and drives 1187, such as magnetic or optical drives. The computer 1110 is configured to communicate with a plurality of sources 1101 via a network 1150 using the one or more I/O ports 1102. The computer 1110 is further configured to communicate with a display 1189, a report device 1190, and a second processing system 1195 via a network 1180 using the one or more I/O ports 1102. When the program code is loaded into memory 1104 and executed by the computer 1110, the machine becomes an apparatus for practicing the invention. When implemented on one or more general-purpose processors 1103, the program code combines with such a processor to provide a unique apparatus that operates analogously to specific logic circuits. As such, a general purpose digital machine can be transformed into a special purpose digital machine.

Figure 12:
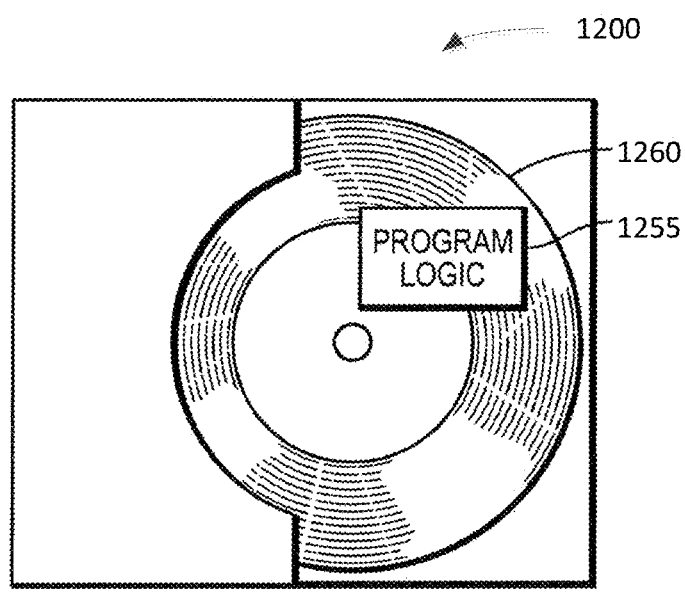

FIG. 12 is a block diagram illustrating a method embodied on a computer readable storage medium 1260 that may utilize the techniques described herein according to an example embodiment of the present invention. FIG. 12 shows Program Logic 1255 embodied on a computer-readable medium 1260 as shown, and wherein the Logic is encoded in computer-executable code configured for carrying out the methods of this invention and thereby forming a Computer Program Product 1200. Program Logic 1255 may be the same logic 1105 on memory 1104 loaded on processor 1103 in FIG. 11. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-12. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method of authenticating a user to a remote computing network using a mobile device, comprising:
    receiving a first portion of authentication data at a server, wherein the first portion of authentication data includes a feature vector generated from an image created using a mobile device;
    performing feature authentication by analyzing the received first portion of authentication data at the server using one or more processors and memory of the server, by comparing the generated feature vector of the first portion of authentication data to a stored feature vector of a second portion of authentication data stored at the server, the stored feature vector being generated from an image stored by the server;
    authenticating the user based on the analysis of the received first portion of authentication data using age adapted authentication to account for age related differences between the first portion of the authentication data and the second portion of authentication data; and
    updating the second portion of the authentication data with additional age invariant features from the first portion of authentication data to increase efficiency of a future authentication of the user;
    wherein authenticating the user includes:
        determining whether differences between the generated feature vector and the stored feature vector are below a threshold value or exceed the threshold value;
        responsive to determining that the differences are below the threshold value, forwarding a signal from the server to the mobile device indicating successful authentication of the user; and
        responsive to determining that the differences exceed the threshold value, requesting through the server that the image be forwarded from the mobile device to the server, and responsive to receipt of the requested image by the server, comparing the requested image with the stored image used to generate the stored feature vector.

2. The computer-executable method of claim 1, wherein the first portion of authentication data includes age invariant features related to the user.

3. The computer-executable method of claim 1, further comprising:
    creating a profile for the user; and
    creating the feature vector based on the profile.

4. The computer-executable method of claim 3, wherein creating a profile comprises:
    receiving a base image of the user;
    analyzing the base image of the user, wherein the server determines whether the base image of the user includes one or more age invariant features; and
    storing the base image of the user.

5. The computer-executable method of claim 1, further comprising:
    determining a rate at which analysis of the received first portion of authentication data determines a false negative authentication.

6. The computer-executable method of claim 5, further comprising:
    wherein if the rate is higher than a specified threshold, requesting the user to update a profile for the user, wherein the updating is enabled to include updating the feature vector in association with the profile.

7. The computer-executable method of claim 1, wherein the age adapted authentication used in authenticating the user is configured to generate a feature vector for the user that initially includes a first number of age invariant features determined from a first image of the user and to subsequently update the feature vector for the user to include one or more additional age invariant features determined from one or more additional images of the user, and wherein the generated feature vector and the updated feature vector are stored for comparison in conjunction with generating a threshold for authenticating the user based at least in part on one or more further age invariant features determined from one or more further images of the user.

8. A system, comprising:
a remote computing network; and
computer-executable program logic encoded in memory of one or more computers enabled to authenticate a user to the remote computing network using a mobile device, wherein the computer-executable program logic is configured for the execution of:
receiving a first portion of authentication data at a server, wherein the first portion of authentication data includes a feature vector generated from an image created using the mobile device;
performing feature authentication by analyzing the received first portion of authentication data by comparing the generated feature vector of the first portion of authentication data to a stored feature vector of a second portion of authentication data stored at the server, the stored feature vector being generated from an image stored by the server;
authenticating the user based on the analysis of the received first portion of authentication data using age adapted authentication to account for age related differences between the first portion of the authentication data and the second portion of authentication; and
updating the second portion of the authentication data with additional age invariant features from the first portion of authentication data to increase efficiency of a future authentication of the user;
wherein authenticating the user includes:
determining whether differences between the generated feature vector and the stored feature vector are below a threshold value or exceed the threshold value;
responsive to determining that the differences are below the threshold value, forwarding a signal from the server to the mobile device indicating successful authentication of the user; and
responsive to determining that the differences exceed the threshold value, requesting through the server that the image be forwarded from the mobile device to the server, and responsive to receipt of the requested image by the server, comparing the requested image with the stored image used to generate the stored feature vector.

9. The system of claim 8, wherein the first portion of authentication data includes age invariant features related to the user.

10. The system of claim 8, wherein the computer-executable program logic is further configured for the execution of:
creating a profile for the user; and
creating the feature vector based on the profile.

11. The system of claim 10, wherein creating a profile comprises:
receiving a base image of the user;
analyzing the base image of the user, wherein the server determines whether the base image of the user includes one or more age invariant features; and
storing the base image of the user.

12. The system of claim 8, wherein the computer-executable program logic is further configured for the execution of:
determining a rate at which analysis of the received first portion of authentication data determines a false negative authentication.

13. The system of claim 12, wherein the computer-executable program logic is further configured for the execution of:
wherein if the rate is higher than a specified threshold, requesting the user to update a profile for the user, wherein the updating is enabled to include updating the feature vector in association with the profile.

14. The system of claim 8, wherein the age adapted authentication used in authenticating the user is configured to generate a feature vector for the user that initially includes a first number of age invariant features determined from a first image of the user and to subsequently update the feature vector for the user to include one or more additional age invariant features determined from one or more additional images of the user, and wherein the generated feature vector and the updated feature vector are stored for comparison in conjunction with generating a threshold for authenticating the user based at least in part on one or more further age invariant features determined from one or more further images of the user.

15. A computer program product for authenticating a user to a remote computing network using a mobile device, comprising:
a non-transitory computer readable medium encoded with computer-executable code, the code configured to enable the execution of:
receiving a first portion of authentication data at a server, wherein the first portion of authentication data includes a feature vector generated from an image created using a mobile device;
performing feature authentication by analyzing the received first portion of authentication data by comparing the generated feature vector of the first portion of authentication data to a stored feature vector of a second portion of authentication data stored at the server, the stored feature vector being generated from an image stored by the server;
authenticating the user based on the analysis of the received first portion of authentication data using age adapted authentication to account for age related differences between the first portion of the authentication data and the second portion of authentication data; and
updating the second portion of the authentication data with additional age invariant features from the first portion of authentication data to increase efficiency of a future authentication of the user;
wherein authenticating the user includes:
determining whether differences between the generated feature vector and the stored feature vector are below a threshold value or exceed the threshold value;
responsive to determining that the differences are below the threshold value, forwarding a signal from the server to the mobile device indicating successful authentication of the user; and
responsive to determining that the differences exceed the threshold value, requesting through the server that the image be forwarded from the mobile device to the server, and responsive to receipt of the requested image by the server, comparing the requested image with the stored image used to generate the stored feature vector.

16. The computer program product of claim 15, wherein the first portion of authentication data includes age invariant features related to the user.

17. The computer program product of claim 15, wherein the code is further configured to enable the execution of:
   creating a profile for the user; and
   creating the feature vector based on the profile.

18. The computer program product of claim 17, wherein creating a profile comprises:
   receiving a base image of the user;
   analyzing the base image of the user, wherein the server determines whether the base image of the user includes one or more age invariant features; and
   storing the base image of the user.

19. The computer program product of claim 15, wherein the code is further configured to enable the execution of:
   determining a rate at which analysis of the received first portion of authentication data determines a false negative authentication;
   wherein if the rate is higher than a specified threshold, requesting the user to update a profile for the user, wherein the updating is enabled to include updating the feature vector in association with the profile.

20. The computer program product of claim 15, wherein the age adapted authentication used in authenticating the user is configured to generate a feature vector for the user that initially includes a first number of age invariant features determined from a first image of the user and to subsequently update the feature vector for the user to include one or more additional age invariant features determined from one or more additional images of the user, and wherein the generated feature vector and the updated feature vector are stored for comparison in conjunction with generating a threshold for authenticating the user based at least in part on one or more further age invariant features determined from one or more further images of the user.

* * * * *